March 30, 1954 M. MORGAN 2,673,820
TREATMENT OF HOT METAL RODS
Original Filed Feb. 7, 1950 5 Sheets-Sheet 2

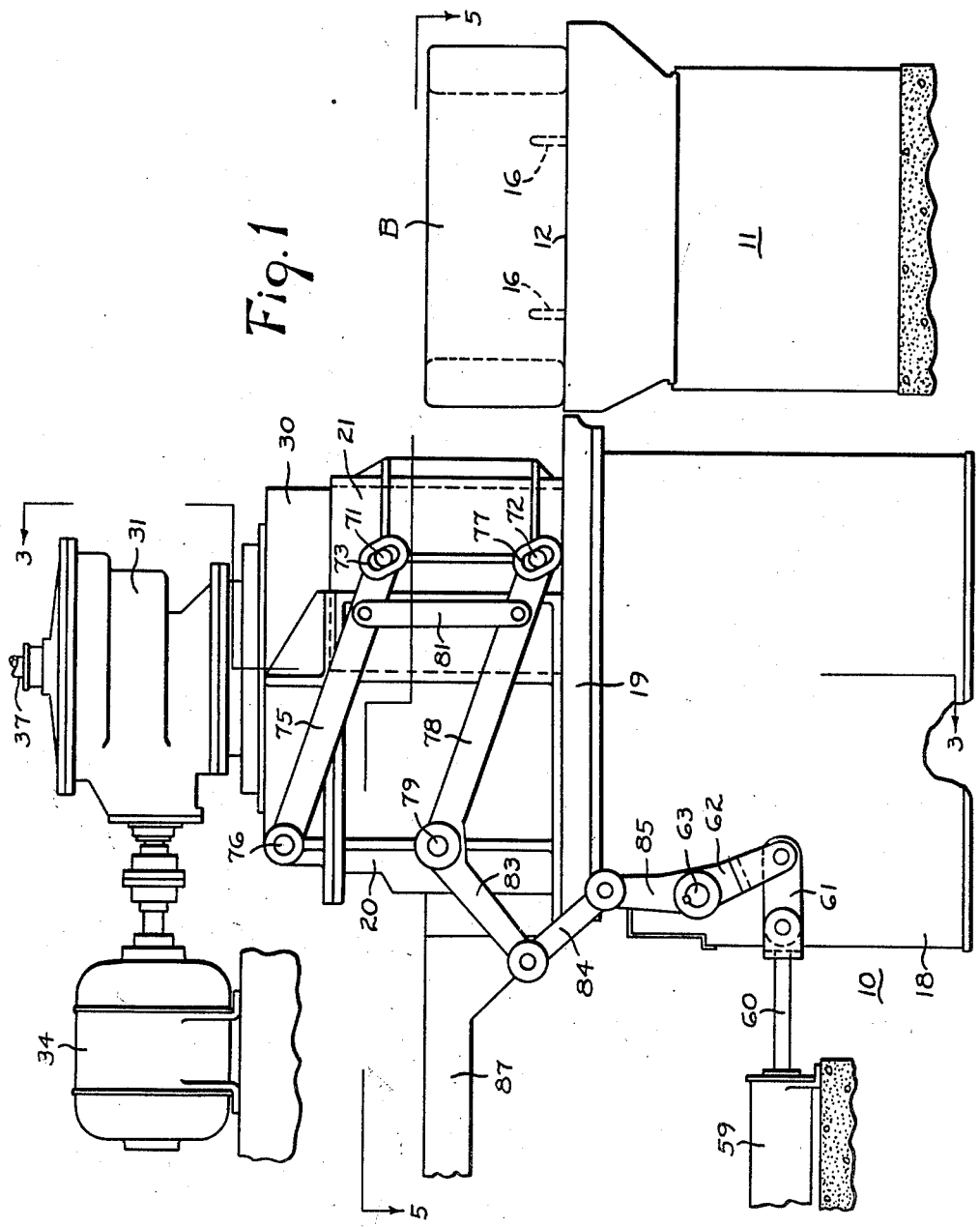

INVENTOR.
MYLES MORGAN
BY
Albert G. Blodgett
ATTORNEY

March 30, 1954 M. MORGAN 2,673,820
TREATMENT OF HOT METAL RODS
Original Filed Feb. 7, 1950 5 Sheets-Sheet 5

INVENTOR.
MYLES MORGAN
BY
Albert G. Blodgett
ATTORNEY

Patented Mar. 30, 1954

2,673,820

UNITED STATES PATENT OFFICE 2,673,820

TREATMENT OF HOT METAL RODS

Myles Morgan, Worcester, Mass., assignor to Morgan Construction Company, Worcester, Mass., a corporation of Massachusetts Original application February 7, 1950, Serial No. 142,908. Divided and this application December 22, 1950, Serial No. 202,371

3 Claims. (Cl. 148—12)

This invention relates to the treatment of hot metal rods, and more particularly to a method whereby hot rods delivered by a rolling mill may be coiled into bundles and at the same time be rapidly reduced in temperature. This application is a division of my application Serial No. 142,908, filed February 7, 1950, now Patent No. 2,621,914.

It is a common practice in this art to coil the red hot rods which leave the rolling mill into annular bundles which are transferred to a conveyor. The bundles are allowed to cool as they are carried along by the conveyor. During the appreciable time required for such cooling, the bundles are fully exposed to the atmosphere. As a result considerable scale forms on the rods, and this scale has to be removed by means of acid treatment before the rods can be drawn into wire. When the rods are made of high carbon steel, slow cooling is particularly undesirable since it results in decarburization of the steel.

It is accordingly one object of the invention to provide a method for cooling hot metal rods with such rapidity as to minimize the formation of scale thereon.

It is a further object of the invention to provide a simple and inexpensive method whereby hot metal rods may be coiled into annular bundles and at the same time cooled so rapidly as to avoid appreciable scale formation.

With these and other objects in view, as will be apparent to those skilled in the art, the invention resides in the steps of the process set forth in the specification and covered by the claims appended hereto.

In accordance with the invention a hot metal rod is formed into an annular bundle having loosely intermingled convolutions so that the bundle is permeable, and while the bundle is being formed a stream of relatively cool air is caused to flow therethrough. Preferably the bundle is formed about an upright axis, and the air flows upwardly through the central opening in the bundle and thence downwardly through the bundle itself.

Referring to the drawings illustrating one form of apparatus for use in practicing the invention and in which like reference numerals indicate like parts, Fig. 1 is an elevation of a reel and an associated rod bundle conveyor, the reel parts being in the positions required for forming a bundle;

Fig. 2 is a view similar to Fig. 1, but with the reel parts in the positions required for discharging a bundle;

Figure 4:
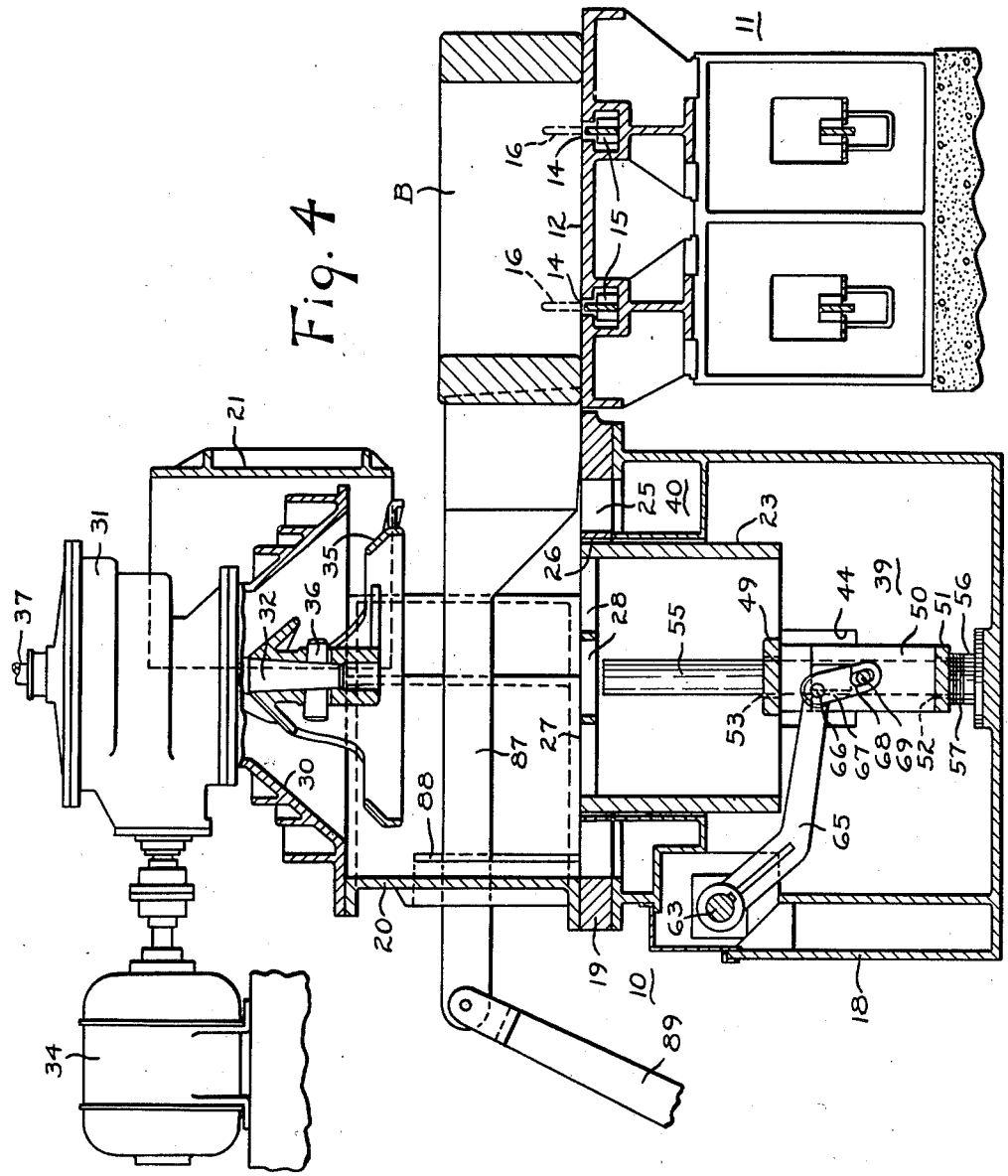
Fig. 4 is a section taken substantially on the line 4—4 of Fig. 3, but with the reel parts in the positions required for discharging a bundle.
Figure 5:
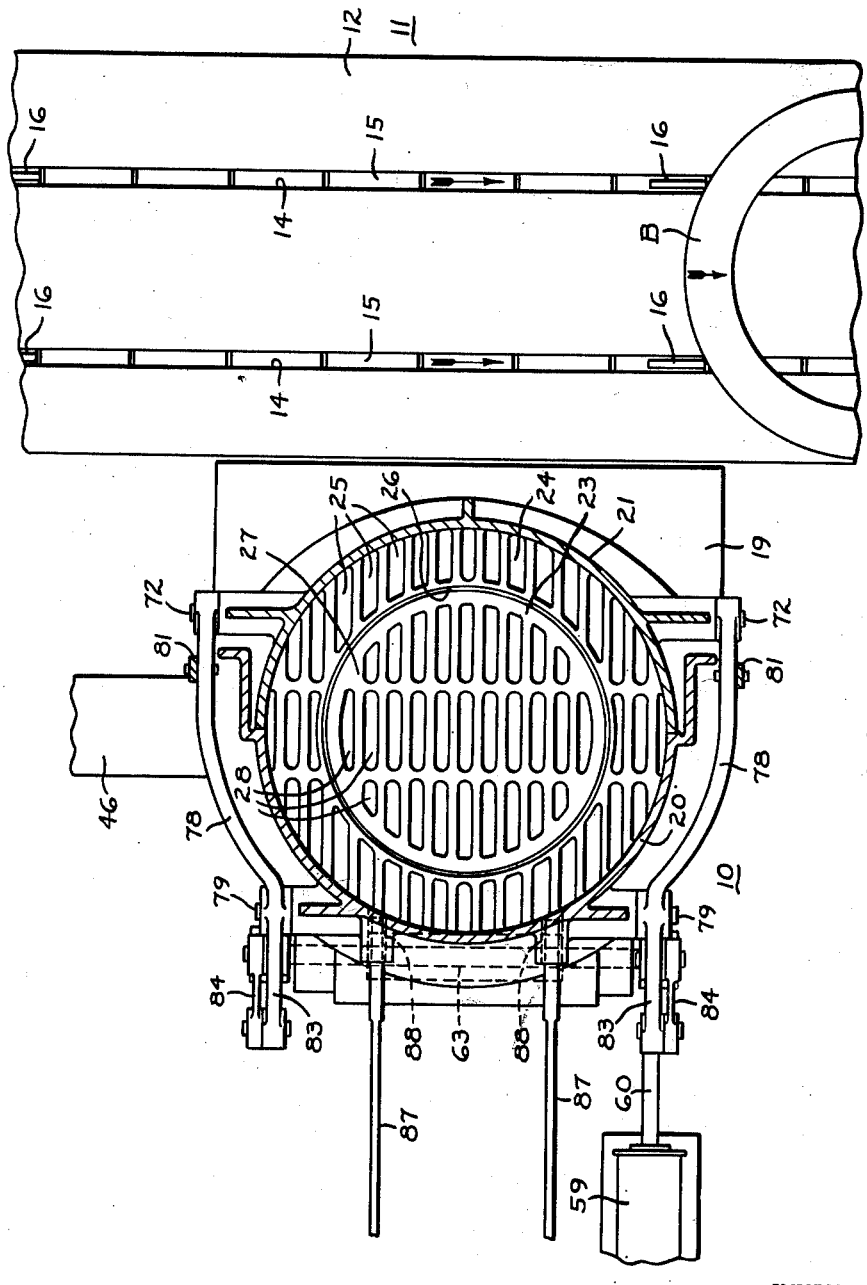
Fig. 5 is a section taken substantially on the line 5—5 of Fig. 1.

In the drawings there is shown a reel 10 arranged to form hot metal rod into annular bundles and to discharge such bundles on to a conveyor 11 of well-known construction. This conveyor comprises a horizontal top plate 12 having two longitudinally extending parallel slots 14 in its upper surface (Figs. 4 and 5). Two parallel endless chains 15 travel beneath the respective slots and carry dogs 16 which project upwardly through the slots. The dogs on the respective chains are arranged in laterally aligned pairs, so that each pair of dogs may engage an annular rod bundle B and push it along the plate 12.

The particular reel 10 illustrated is of the general type known in the art as a "laying" reel, such reels being arranged to receive a longitudinally traveling hot metal rod and to bend the rod into a series of superimposed and loosely intermixed stationary generally circular convolutions which form an annular bundle. This reel comprises a hollow base structure 18 located at one side of the conveyor 10 and supporting a horizontal plate 19, the top of this plate being substantially flush with the top of the conveyor plate 12. Above the plate 19 there are provided two upright wall members 20 and 21, each curved horizontally in substantially a semi-circular arc, the two members jointly forming a complete cylindrical wall as shown in Fig. 5. The rear wall member 20 is suitably fastened in a fixed position to the plate 19 therebeneath, whereas the front wall member 21 forms a gate which may be raised above the plate 19, as will be explained hereinafter, to permit discharge of a complete rod bundle from the reel to the conveyor. A hollow cylindrical drum 23 is mounted within the cylindrical wall formed by the members 20—21 and coaxial therewith, the drum being somewhat smaller in diameter than the said wall to provide an annular trough 24 (Fig. 3) therebetween having a portion of the plate 19 as its bottom wall. This portion of the plate 19 is provided with openings 25 extending therethrough. The plate 19 is also formed with a central circular opening 26 very slightly exceeding the drum 23 in diameter so that the drum may be drawn downwardly therethrough to permit discharge of a rod bundle, as will be described hereinafter. The drum is provided at its upper end with a horizontal wall 27 having openings 28 extending therethrough.

On the top of the wall member 29 there is mounted a frusto-conical cap or closure 30 which in turn supports a gear box 31 from which the tapered lower end of the vertical rotatable shaft 32 extends downwardly toward the drum 23 and coaxial therewith. This gear box is of the usual construction employed in laying reels, and it contains suitable bevel gearing connecting an electric motor 34 to the shaft 32 to drive the same. The usual revoluble coiler or guide 35 is secured to the lower end of the shaft 32 by a wedge 36, and the usual vertical guide pipe 37 enters the top of the gear box 31 in alignment with the shaft 32. These parts are so constructed and arranged, in accordance with well-known practice, that a hot metal rod may travel downwardly through the pipe 37 and the gear box 31, and the revolving coiler 35 will lay the rod in the annular trough 24 in the form of superimposed generally circular convolutions. These convolutions will be so loosely intermingled as to provide a permeable annular bundle.

Figure 3:
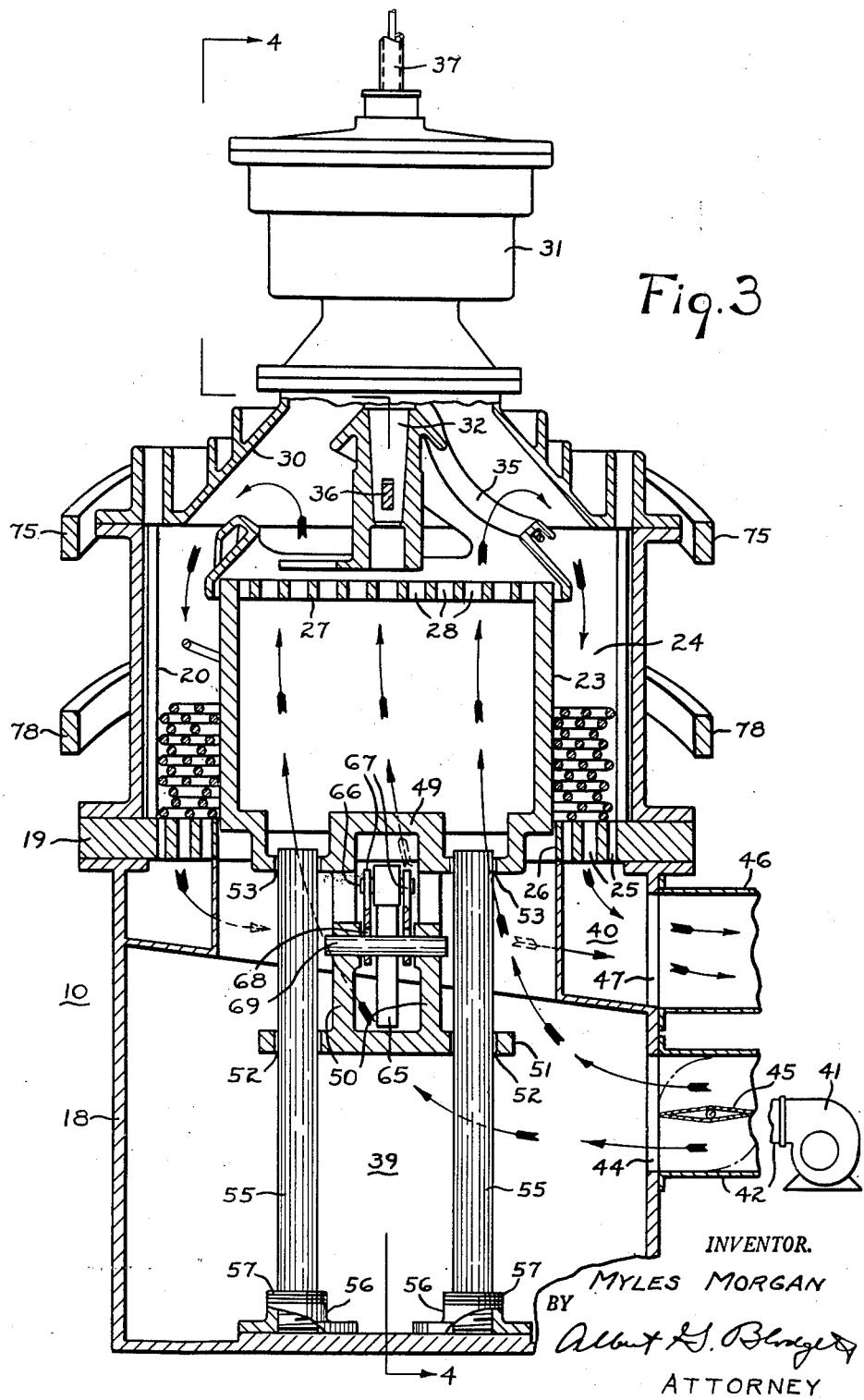
Fig. 3 is a section taken substantially on the line 3—3 of Fig. 1.

The apparatus illustrated includes means to bring about a flow of relatively cool air through the bundle while it is being formed, thereby cooling the bundle with comparative rapidity and avoiding excessive scale formation on the rod. For this purpose the hollow base structure 18 is shaped to provide a plenum chamber 39 which communicates directly with the open lower end of the drum 23, further to provide an annular chamber 40 located beneath the plate 19 and communicating directly with the openings 28 therein. As shown in Fig. 3, a fan 41 is arranged to blow air through a duct 42 leading to an opening 44 in one wall of the plenum chamber 39, this duct having a damper 45 therein. A second duct 46 is connected to an opening 47 in one wall of the annular chamber 40. These parts are so constructed and arranged that while a bundle is being formed the fan 41 will blow air through the duct 42 and the opening 44 into the chamber 39. This air will flow upwardly through the drum 23 and the revolving coiler 35. The air will thereupon be diverted by the cap 30 and compelled to flow downwardly through the bundle and the openings 28 into the annular chamber 40, and thence outwardly through the opening 47 into the duct 46. By flowing in contact with the hot rod and absorbing heat therefrom the air will become heated. The duct 46 may serve to conduct the hot air out of the building in warm weather, whereas in cold weather this air may aid in heating the building if desired.

In order to permit stripping of a completed bundle from the reel, mechanism is provided to lower the drum 23 to bring its upper end substantially flush with the surrounding plate 19, as shown in Fig. 4. For this purpose a substantially horizontal bar 49 extends diametrically across the lower end of the drum, and from the central portion of this bar two horizontally spaced vertical struts 50 (Fig. 3) extend downwardly to a lower horizontal bar 51. The end portions of the lower bar 51 are provided with circular openings 52, and the upper bar 49 is provided with two circular openings 53 which are vertically aligned with the respective openings 52. Two vertical pipes 55 extend through the openings 52 and 53 to guide the drum 23 as it is moved upwardly or downwardly, the lower ends of these pipes being mounted in pipe flanges 56 secured to the bottom wall of the chamber 39. Several thin rings 57 surround the lower portions of the pipes 55 to serve as abutments limiting downward movement of the bar 51. By removing or adding rings, the abutments can be adjusted. For actuation of the drum 23 there is provided a double-acting hydraulic motor or cylinder 59 (Fig. 1) having a reciprocable piston rod 60 which is connected by a link 61 to the lower end of a lever 62, this lever being keyed to one end of a horizontal shaft 63 which is rotatably mounted in the rear portion of the base structure 18 and extends through the plenum chamber 39 in a direction parallel with the conveyor 11. As shown in Fig. 4, the rear end of an arm 65 is keyed to the shaft 63 within the chamber 39, and the front end of this arm extends between the struts 50 and carries a transverse pin 66 from which two links 67 depend. The lower ends of these links are provided with slots 68 through which a transverse pin 69 extends, the ends of this pin being supported in the struts 50. When the arm 65 is lowered as shown in Fig. 4, the slots 68 will permit the bar 51 to rest upon the abutment rings 57.

The motor 59 serves not only to actuate the drum 23 but also to raise and lower the semicircular gate 21 which forms the front wall of the annular trough 24. For this purpose, two pins 71 project from opposite sides of the upper portion of the gate 21, and two pins 72 project from opposite sides of the lower portion of the gate, the pins 72 being directly beneath the corresponding pins 71. The upper pins 71 engage slots 73 in the front ends of two arms 75 located on opposite sides of the reel, the rear ends of these arms being pivotally connected to the rear portion of the cap 30 by pins 76. The lower pins 72 engage slots 77 in the front ends of two arms 8 located on opposite sides of the reel, the rear ends of these arms being connected to the rear portion of the rear wall member 20 by pins 79. The slots 73 and 77 are inclined downwardly and forwardly. The front portion of each upper arm 75 is connected to the corresponding lower arm 78 therebeneath by a vertical link 81. The pins 79 are located directly beneath the pins 76, and the vertical spacing of these pins is the same as the vertical spacing of the pins 71—72. On the rear end of each lower arm 78 there is provided a rearwardly and downwardly extending arm 83 which is connected by a link 84 to the upper end of an arm 85. The arms 85 are keyed to the corresponding ends of the shaft 63, and the arm 85 adjacent the lever 62 may conveniently be formed integral therewith. These various parts are so constructed and arranged that as the motor 59 turns the shaft 63 in a clockwise direction from the position shown in Fig. 1 to that shown in Fig. 2 (as required to lower the central drum 23 of the reel) the arms 75 and 78 will raise the gate 21. When the gate is in its lowermost position as shown in Fig. 1, the slots 73 and 77 permit the gate to rest upon the plate 19 therebeneath and yet hold it closely against the adjacent portions of the wall member 20. As the arms 75 and 78 start to move upwardly, the slots 73 and 77, because of their inclination, will move the gate slightly forwardly and out of contact with the wall member 20 before raising the gate.

Once the gate 21 has been raised, and the drum 23 has been lowered simultaneously, the completed and cooled bundle B can be pushed forwardly beneath the raised gate on to the conveyor 11. This may be accomplished by means of two laterally spaced parallel horizontal pusher rods 87 of well-known construction which extend at right angles with the conveyor and are slidable through slots 88 in the stationary wall member 20. These rods may be actuated in known manner by means of upright arms 89 connected to the rear ends of the rods.

The operation of the apparatus will now be apparent to those skilled in the art. With the drum 23 raised and the gate 21 lowered, the reel 10 will be in condition to receive a hot metal rod which will travel downwardly through the pipe 37. The revolving guide 35 will lay the rod in generally circular superimposed convolutions within the trough 24 to form an annular bundle. With the damper 45 open the fan 41 will blow relatively cool air through the duct 42 into the chamber 39, thence upwardly through the drum 23 and the openings 28 in its upper wall, thence outwardly and downwardly through the bundle as it is being formed, and thence downwardly through the openings 25 into the annular chamber 40 and outwardly through the duct 46. Thus a considerable cooling of the bundle will take place during its formation. Upon completion of the bundle, the motor 59 will be energized to turn the shaft 63 as required to lower the arm 65 and the drum 23, while at the same time raising the arms 75 and 78 with the gate 21. The pusher rods 87 may then be actuated to push the bundle forwardly on to the conveyor 11 as indicated in Fig. 4. If desired, the damper 45 can be closed during the discharge of the bundle to stop the air flow, although this may not always be considered necessary. Upon withdrawal of the pusher rods 87, and energization of the motor 59 to raise the drum 23 and lower the gate 21, the reel will be ready to receive and coil another rod.

By cooling the rod promptly and rapidly while it is being formed into a bundle, the invention greatly reduces scale formation on the rod; hence less acid is required for cleaning the bundles, and the loss in weight of the bundles is less. In the case of high carbon steel, decarburization is avoided. Since the bundles reach the conveyor 11 at a lower temperature, they may be transferred soon thereafter to the usual hook carrier without danger of distortion, hence the conveyor may be appreciably shorter than would otherwise be required.

Having thus described my invention, what I claim as new and desire to secure by Letters Patent is:

1. The method of treating a hot ferrous metal rod above the critical temperature comprising the steps of bending the rod into a series of generally circular convolutions which are loosely intermingled to form a permeable annular bundle, adding convolutions in the direction of the axis so that the bundle gradually increases in size in a direction parallel with its axis, and causing relatively cool air to flow upwardly through the space in the center of the bundle and then downwardly through the convolutions of the bundle, while it is being formed, in a direction generally opposed to that in which the increase in size is taking place.

2. The method of treating a longitudinally traveling hot ferrous metal rod comprising the steps of guiding the rod while above the critical temperature in a downward path, laying the portion of the rod below said path in a generally horizontal circular path to form a series of generally circular superimposed stationary convolutions which are loosely intermingled to provide a permeable annular bundle, and blowing relatively cool air upwardly through the space at the center of the bundle and then downwardly through the convolutions of the bundle while it is being formed.

3. A method of cooling ferrous rods which comprises taking a hot rolled rod after it leaves the finishing roll pass at a temperature at least as high as the critical range, passing the rod into a coil-forming apparatus, forming the rod into an annular coil, passing air substantially at room temperature upwardly through the center of the coil during coiling, preventing passage of the air radially outwardly through the coil, causing the air flow to reverse in the space over the coil, and causing the air to pass downwardly through the coil itself.

MYLES MORGAN.

References Cited in the file of this patent

UNITED STATES PATENTS

| Number | Name | Date |
|---|---|---|
| 854,810 | Daniels | May 28, 1907 |
| 2,516,248 | O'Brien | July 25, 1950 |